United States Patent
Matsuno et al.

(10) Patent No.: US 6,383,105 B1
(45) Date of Patent: May 7, 2002

(54) GUIDE PLATE FOR A SILENT CHAIN

(75) Inventors: Kazumasa Matsuno; Hitoshi Ohara; Shigekazu Fukuda; Masao Maruyama; Hiroshi Horie; Takayuki Funamoto; Yoshihiro Kusunoki, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/721,630

(22) Filed: Nov. 24, 2000

(30) Foreign Application Priority Data

Nov. 24, 1999 (JP) ............................................ 11-333031

(51) Int. Cl.7 .............................................. F16G 13/04
(52) U.S. Cl. ...................................... 474/213; 474/214
(58) Field of Search ................................ 474/213, 212, 474/214, 217, 215, 229, 216, 206, 155; D34/29, 35

(56) References Cited

U.S. PATENT DOCUMENTS

| | | |
|---|---|---|
| 653,462 A | 7/1900 | West |
| 741,453 A | 10/1903 | Butler |
| 769,971 A | 9/1904 | Whitney |
| 799,072 A | 9/1905 | Morse |
| 1,004,389 A * | 9/1911 | Moore ........................ 474/213 |
| 1,270,460 A * | 6/1918 | Taylor ........................ 474/213 |
| 1,634,642 A | 7/1927 | Bens |
| 1,780,040 A | 10/1930 | Pierce |
| 1,860,514 A | 5/1932 | Stiansen |
| 1,865,844 A | 7/1932 | Dull |
| 1,919,768 A | 7/1933 | Brandt |
| D169,878 S | 6/1953 | Washington |
| 2,669,879 A | 2/1954 | Pierce |
| 2,769,346 A * | 11/1956 | Flocke ........................ 474/213 |
| D227,746 S | 7/1973 | Vitas |
| 3,804,232 A | 4/1974 | Freiwald |
| 4,034,556 A | 7/1977 | Riber |
| 4,993,543 A | 2/1991 | Lapeyre |
| 5,236,400 A | 8/1993 | Tsuyama |
| RE34,688 E | 8/1994 | Lapeyre |
| 5,372,554 A | 12/1994 | Okuda |
| 5,393,272 A | 2/1995 | Okuwaki |
| 5,435,789 A | 7/1995 | Avramidis |
| 5,445,570 A | 8/1995 | White |
| 5,453,058 A | 9/1995 | Reese |
| D373,950 S | 9/1996 | Otani |
| 5,803,854 A | 9/1998 | Tada |
| 5,902,203 A | 5/1999 | Kanehira |
| 5,921,881 A | 7/1999 | Nakamura |
| 5,941,059 A | 8/1999 | Kanehira |
| 6,077,181 A | 6/2000 | Kanehira |
| 6,159,122 A * | 12/2000 | Kanehira et al. ........... 474/212 |
| D449,416 S * | 10/2001 | Horie et al. ................. D34/35 |

\* cited by examiner

Primary Examiner—Thomas R. Hannon
Assistant Examiner—Marcus Charles
(74) Attorney, Agent, or Firm—Howson & Howson

(57) ABSTRACT

A guide plate a for silent chain is substantially arch-shaped and has a pair of pin holes formed therein at a position adjacent to opposite free ends of the arch-shaped guide plate. The arch-shaped guide plate further has an arcuate inner peripheral surface and an arcuate outer peripheral surface both extending arcuately about a center located at the midpoint of a pitch line segment interconnecting the pair of pin holes. The arcuate inner peripheral surface has a radius of curvature which is in the range of 35 to 45% of the chain pitch, and the arcuate outer peripheral surface is blended with the opposite free ends of the arch-shaped guide plate.

3 Claims, 4 Drawing Sheets

GUIDE PLATE FOR A SILENT CHAIN

BACKGROUND OF THE INVENTION

The present invention relates generally to a silent chain used as a power drive chain in an automobile transmission drive unit, and more particularly to guide plates for a silent chain, the guide plates being arranged to sandwich toothed link plates of the chain in order to guide the chain as it travels around a sprocket.

FIG. 5 illustrates a conventional guide plate known from Japanese Patent Laid-open Publication No. HEI-8-35541. The guide plate is generally U-shaped and has a pair of apertures A, A formed in a pair of legs B, B, respectively, of the U-shaped guide plate. The legs B each have an outside flank C and an inside flank D. The inside flank D has a base portion D1 blended with an arcuate crotch D2. The crotch D2 extends upward to a position immediately below an upper end of each aperture A. By virtue of its arcuate or rounded shape, the crotch D2 is able to minimize the occurrence of fatigue cracks caused by stress concentration.

The aperture pitch, thickness and hardness of the guide plate are made smaller than those of the link plates, so that the guide plate has a lower yield strength than the link plates for ensuring that, after prestressed operation of the silent chain, the guide link pitch becomes substantially equal to the link plate pitch to thereby lessen the residual bending stress in the connecting pins.

However, for the aforesaid pitch equalization achieved by the prestressed operation, the guide plate is so designed as to undergo plastic deformation when subjected to a smaller yield load than the link plates. Accordingly, the durability of the guide plate is very low, and the fatigue strength of the chain as a whole is considerably reduced.

From a noise-reduction point of view, it is preferable that the guide plate have a spring characteristic or resiliency in the longitudinal direction of a chain. Due to its generally U-shaped configuration including a pair of legs B, B joined together by an round crotch D2 blended with the base portion of an inside flank D of each leg B at a position immediately below the upper end of an aperture A formed in each leg B, the guide plate operates as a rigid member when the link plates come into meshing engagement with a sprocket (not shown). The guide plate is, therefore, unable to exhibit the spring characteristic.

The guide plates, acting as rigid members, are unable to sufficiently absorb impacts occurring when the silent chain comes into meshing engagement with the sprocket. This allows the silent chain to oscillate like a vibrating string or cord with the result that collision sounds are produced upon repeated striking of the vibrating chain on the sprocket teeth. It is, therefore, hardly expected that the meshing noises resulting from the collision sounds can be reduced.

In addition, since a space formed between link teeth and sprocket teeth in mutual meshing engagement is completely closed from the opposite sides by the guide plates, compressive sounds are produced upon mutual meshing engagement between the link teeth and the sprocket teeth. The compressive sounds add to the meshing noises of the silent chain.

SUMMARY OF THE INVENTION

It is accordingly a general object of the present invention to overcome the drawbacks associated with the prior art.

A more specific object of the present invention is to provide a guide plate for silent chains which is capable of precluding stress concentration and absorbing impacts occurring when the silent chain comes into meshing engagement with a sprocket, thereby securing excellent durability and reduced meshing noises.

According to one aspect of the present invention, there is provided an improved guide plate for a silent chain having a chain pitch. The guide plate is substantially arch-shaped and has a pair of pin holes formed therein at a position adjacent to opposite free ends of the arch-shaped guide plate. The arch-shaped guide plate further has an arcuate inner peripheral surface and an arcuate outer peripheral surface both extending arcuately about a center located at the midpoint of a pitch line segment interconnecting the pair of pin holes. The arcuate inner peripheral surface has a radius of curvature which is 35 to 45% of the chain pitch, and the arcuate outer peripheral surface is blended with the opposite free ends of the arch-shaped guide plate.

According to another aspect of the present invention, there is provided a silent chain having a chain pitch and comprising a large number of link plates articulately connected together in an interleaved fashion by means of connector pins. Each of the link plates has a pair of pin holes through which connector pins of a pair of connector pins are inserted, respectively, and a pair of link teeth for meshing engagement with a sprocket and connected together by an arcuate crotch. Guide plates are disposed in pairs on opposite outer sides of the interleaved link plates for guiding travel of the silent chain around the sprocket. The guide plates are substantially arch-shaped, and bent toward the sprocket. Each of the guide plates has a pair of pin holes formed therein at a position adjacent to opposite free ends of the arch-shaped guide plate for fitting engagement with a pair of connector pins. The arch-shaped guide plate further has an arcuate inner peripheral surface and an arcuate outer peripheral surface both extending arcuately about a center located at the midpoint of a pitch line segment interconnecting the pair of pin holes. The arcuate inner peripheral surface has a radius of curvature which is 35 to 45% of the chain pitch, and the arcuate outer peripheral surface is blended with the opposite free ends of the arch-shaped guide plate.

It is preferable that the arcuate inner peripheral surface of each guide plate has a lowest part or bottom located closer to the sprocket than the top of the arcuate crotch of a mating one of the link plates, there being defined between the arcuate inner peripheral surface and the arcuate crotch a substantially almond-shaped space which opens at opposite ends in the widthwise direction of the silent chain.

The connector pin firmly engaged with a guide plate may be a rounded pin, or a rocker joint pin composed of a pair of pins of different lengths. When the rocker joint pin is used, the longer pin is firmly engaged with the guide plate.

The term "pitch" used herein is intended to refer a chain pitch, which is the distance between two adjacent pin holes. Especially when a round pin is used, the chain pitch is represented by the center distance between two adjacent pin holes. Alternatively, when a rocker joint pin is used, the chain pitch is represented by the distance between two adjacent long pins measured at respective faces held in rolling contact with corresponding faces of the shorter pins. This distance is substantially equal to the distance between a pair of pin holes formed in the guide plate.

The arcuate inner peripheral surface of the guide plate has a radius of curvature which is in the range of 35 to 45% of the chain pitch. By thus setting the range of the radius of curvature of the arcuate inner peripheral surface, the guide plate can possess an area around each pin hole which is sufficient to maintain the desired strength of the pin hole, and which is capable of displaying an appropriate spring characteristic or degree of resiliency without causing plastic deformation during the prestressed operation or usual power-transmitting operation of the silent chain. If the radius of curvature is below 35% of the chain pitch, stresses created in the guide plate during the prestressed operation or the usual power-transmitting operation cannot be limited within a range of elastic deformation of the guide plate. Conversely, if the radius of curvature exceeds 45% of the chain pitch, the guide plate is no longer able to maintain the necessary strength at portions or areas surrounding the pin holes.

The link plates used in combination with the guide plate may be of the so-called "inside flank engagement" type, in which the inside flank of one of teeth of each link plate comes first into sliding contact with the sprocket teeth at the beginning of meshing engagement, or of the so-called "outside flank engagement" type, in which the outside flank of one of teeth of each link plate comes first into sliding contact with the sprocket teeth at the beginning of meshing engagement. However, the inside flank engagement type link plats are preferable because the sliding sound of the link teeth can be reduced to thereby decrease the meshing noises of the silent chain as a whole.

Since the arcuate inner and outer peripheral surfaces of the arch-shaped guide plate extend about the center located at the midpoint of the pitch line segment interconnecting the pair of pin holes of the guide plate, and since the arcuate inner peripheral surface has a radius of curvature ranging from 35 to 45% of the chain pitch and the arcuate outer peripheral surface is blended with the opposite free ends of the arch-shaped guide plate, the guide plate functions as a rigid member during meshing engagement between the silent chain and the sprocket. However, since stresses created in the guide plate are distributed uniformly over the entire area of the arch-shaped guide plate, the guide plate is completely free from plastic deformation which would otherwise occur due to stress concentration. The arch-shaped guide plate can exhibit an appropriate spring action or resiliency which is effective to absorb impacts applied to the sprocket during meshing engagement between the silent chain and the sprocket.

In addition, since the bottom of the arcuate inner peripheral surface of the guide plate is located closer to the sprocket than the top of the arcuate crotch of a mating one of the link plates, there is a substantially almond-shaped space defined between the arcuate inner peripheral surface and the arcuate crotch. The almond-shaped space is open at opposite ends in the widthwise direction of the silent chain. Thus, a space defined between the link plate teeth and the sprocket teeth meshing with each other is not closed from opposite sides by the guide plates but allowed to communicate with the outside air. With this arrangement, mutual meshing engagement between the link plate teeth and the sprocket teeth does not produce compressive sounds, and an excess amount of lubricating coil trapped in the space between the link plate teeth and the sprocket teeth is permitted to flow smoothly toward opposite ends of the space which open in the widthwise direction of the silent chain.

The above and other objects, features and advantages of the present invention will become apparent to those versed in the art upon making reference to the following detailed description and accompanying sheets of drawings in which a preferred structural embodiment of the present invention is shown by way of illustrative example.

BRIEF DESCRIPTION OF THE DRAWINGS

A preferred embodiment of the present invention will now be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
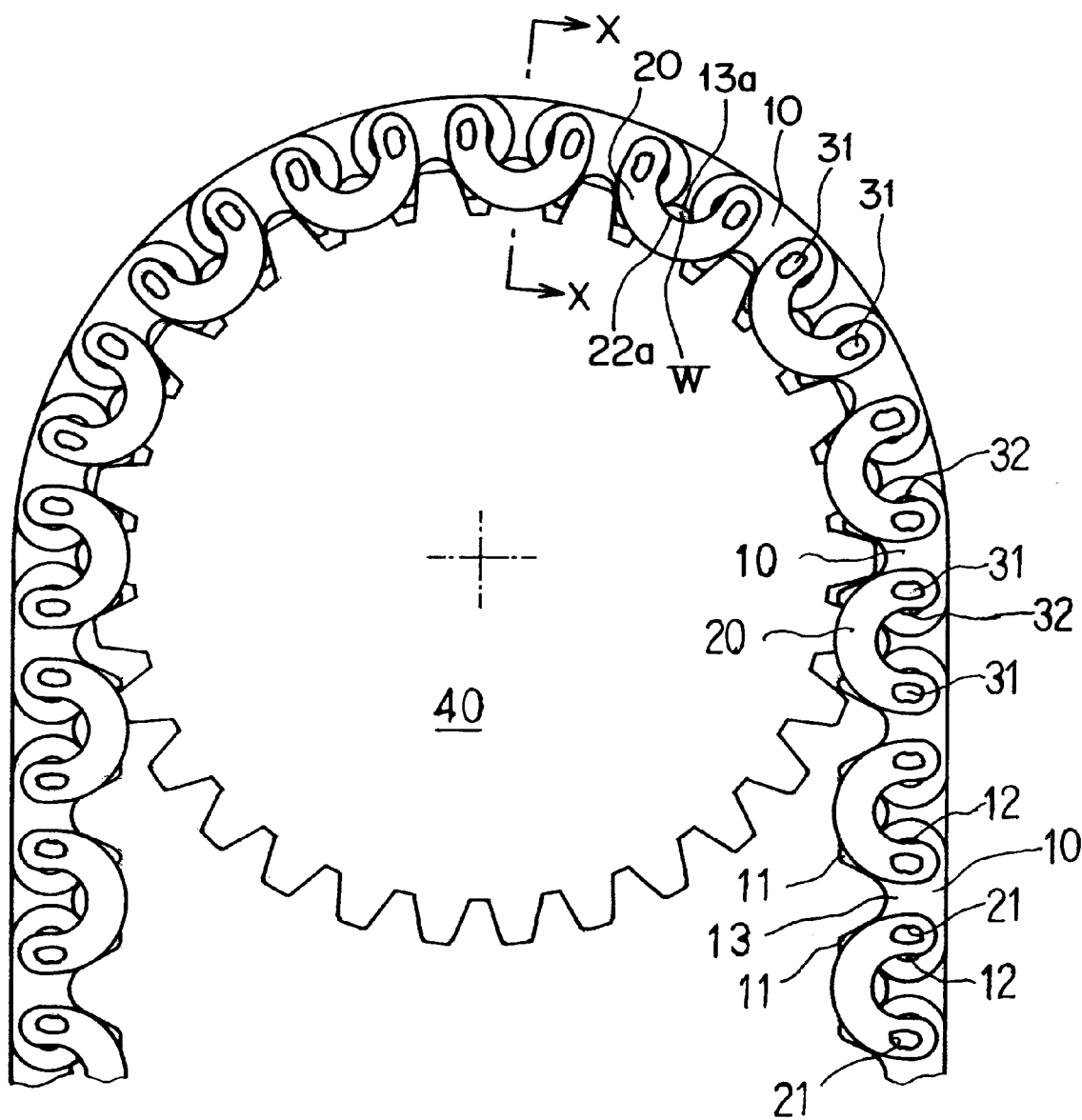
FIG. 1 is a fragmentary front elevational view of a silent chain having guide plates according to an embodiment of the present invention.
Figure 2:
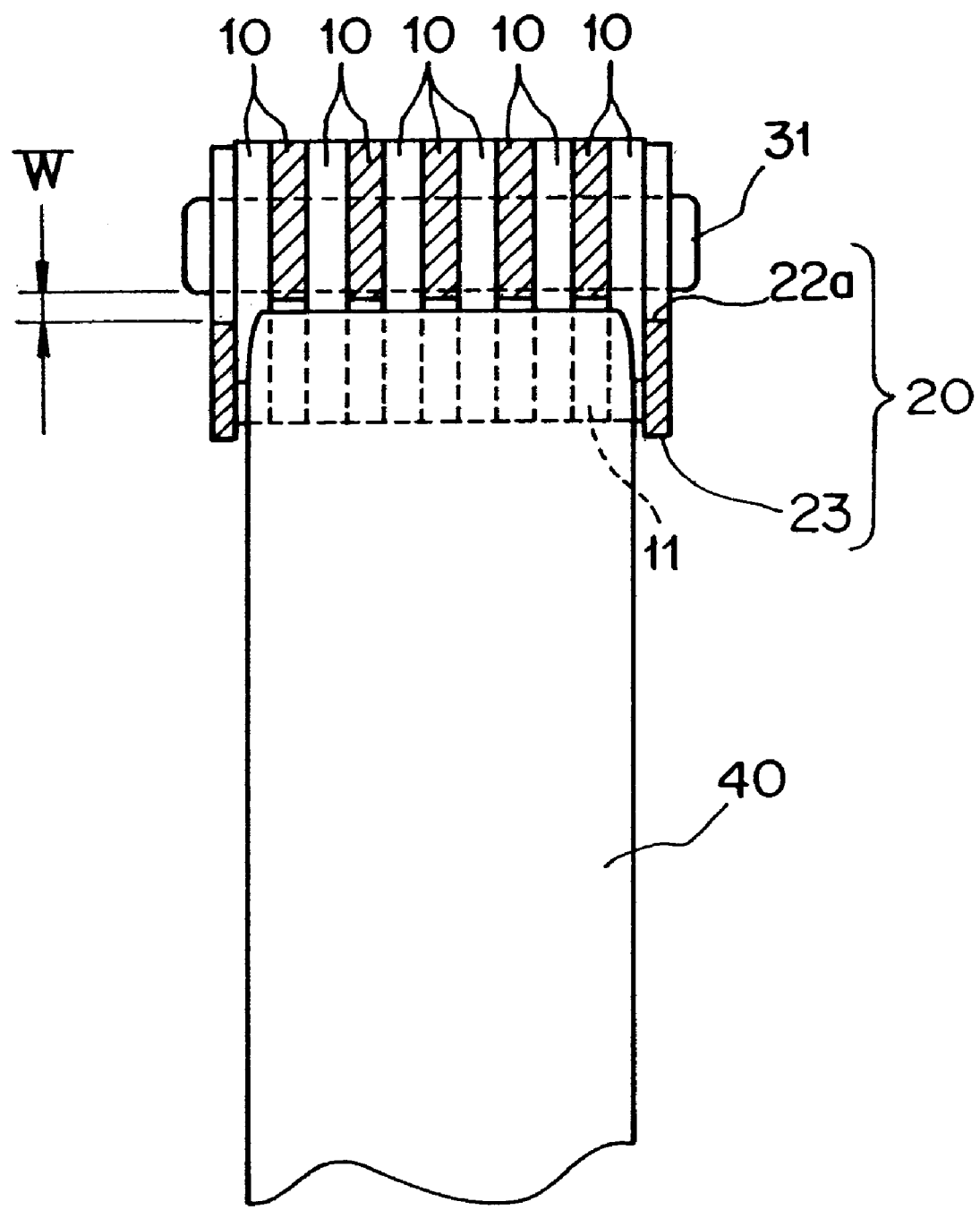
FIG. 2 is an enlarged cross-sectional view taken along the line X—X of FIG. 1.
Figure 3:
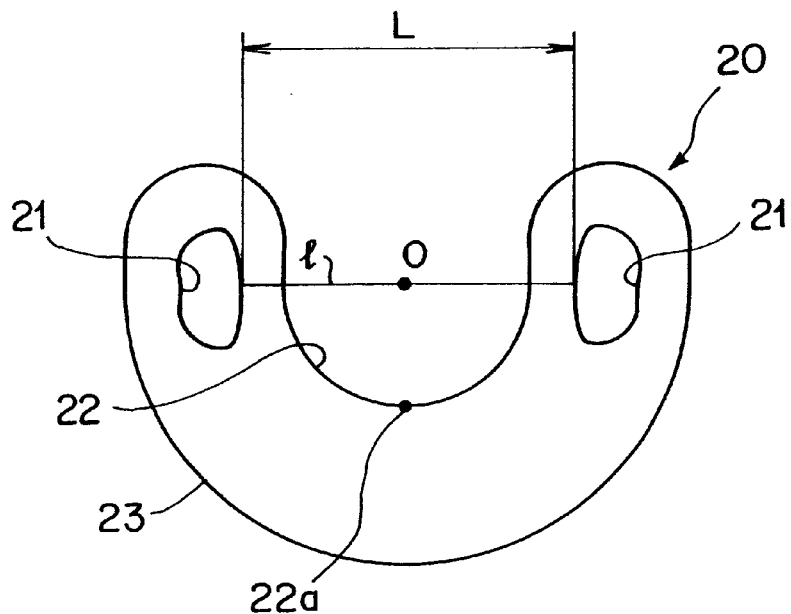
FIG. 3 is a front elevational view of the guide plate.

FIGS. 1 and 2 show a rocker joint type silent chain in which a guide plate embodying the present invention is incorporated. The silent chain is wound around a sprocket 40 attached to, for example, an automobile transmission drive unit for performing power-transmitting operation. The silent chain includes a large number of link plates articulately connected together in an interleaved fashion by means of rocker joint pins, each composed of a pair of pins 31, 32 of different lengths. The link plates 11 each have a pair of bifurcated teeth 11 designed for meshing engagement with teeth of the sprocket 40, and a pair of pin holes 32 through which the shorter pins 33 are inserted. The teeth 11 are connected together by an arcuate crotch 13a. The silent chain further includes guide plates 20 disposed on opposite outer sides of the interleaved link plates 10 for guiding travel of the silent chain around the sprocket 40. The guide plates 20 each have a pair of pin holes 21 in which the longer pins 31 are fitted.

The longer pin 31 and the shorter pin 32 are disposed face to face and they are rotatably inserted through one of the pair of pin holes 12 of each link plate 10. The longer pin 31 is fitted with one of the pair of pin holes 21 of each guide plate 20 and firmly connected by press-fitting or staking to the guide plate 20. Thus, the longer pin 31 is non-rotatable relative to the pin hole 21.

As shown in FIG. 2, the guide plate 20 according to the present invention is generally arch-shaped and has a pair of pin holes 21 formed therein at positions adjacent to opposite free ends of the arch-shaped guide plate 20. As previously described, the pin holes 21 firmly receive therein one end of a pair of longer pins 31.

The arch-shaped guide plate 20 has an arcuate inner peripheral surface 22 and an arcuate outer peripheral surface 23, both extending arcuately about a center O located at the midpoint of a pitch line segment 1 interconnecting the pair of pin holes 21.

The arcuate inner peripheral surface 22 has a radius of curvature which is in the range of 35 to 45% of the chain pitch L, which is represented by the distance between two adjacent longer pins 31, 31, measured at an inner surface held in rolling contact with a corresponding inner surface of the mating shorter pins 32 (see FIG. 1). By thus designing the inner peripheral surface 22, the guide plate 20 can possess a sufficient area around each pin hole 21, which is required to maintain the desired strength of the pin hole 21 and which is able to perform a spring action without causing plastic deformation during the prestressed operation or usual power transmitting operation of the silent chain.

The arcuate outer peripheral surface 23 may be in the form of a perfect arc of a circle or a substantially arcuate configuration. The outer peripheral surface 23 is blended at opposite ends with the opposite free ends of the guide plate 20.

The arcuate inner peripheral surface 22 has a lowest part or bottom 22a located at the middle thereof. As shown in FIG. 1, the bottom 22a of the arcuate inner peripheral surface 22 is offset from the top 13a of the crotch 13 of each of the mating link plates 10 toward the sprocket 40. Thus, when the silent chain is in mesh with the sprocket 40, the crotch 13 of one link plate 10 and the arcuate inner peripheral surface 22 of a mating guide plate 20 form therebetween a substantially almond-shaped space W. The space W is open at opposite ends in the widthwise direction of the silent chain.

Figure 4:
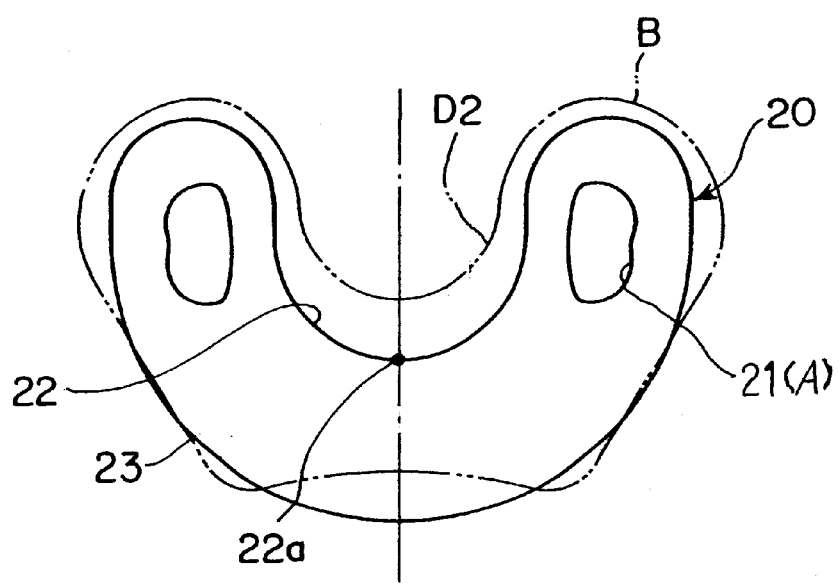
FIG. 4 is a view similar to FIG. 3, but showing a conventional guide position together with the inventive guide plate for the purpose of comparison.
Figure 5:
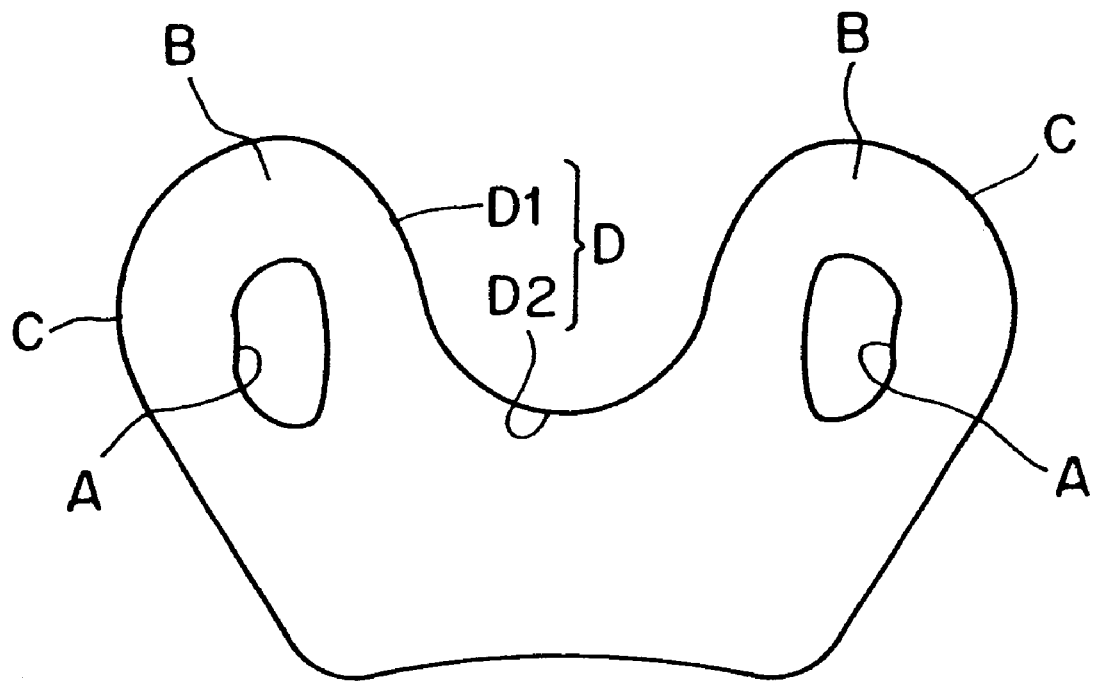
FIG. 5 is a front elevational view showing the conventional guide plate.

FIG. 4 illustrates, for comparative purposes, the guide plate 20 of the present invention and the conventional guide plate of FIG. 5 arranged together in superposed condition with the pin holes 21(A) taken as a positioning reference. In FIG. 4, the guide plate 20 is indicated by solid lines and the conventional guide plate is indicated by phantom lines. It appears clearly from FIG. 4 that the bottom 22a of the arcuate inner peripheral surface 22 of the arch-shaped guide plate 20 is offset inwardly to a great extent from the bottom of the rounded crotch D2 of the phantom-lined conventional U-shaped guide plate. This means that the bottom 22a of the arcuate inner peripheral surface 22 is located closer to the sprocket (FIGS. 1 and 2) than the bottom of the rounded crotch D2. The arcuate outer peripheral surface 23 of the arch-shaped guide plate 20 projects outwardly from a substantially flat outer surface of the U-shaped conventional guide plate.

The guide plate 20 of the foregoing construction functions as a rigid member while the silent chain is in mesh with the sprocket 40 (FIGS. 1 and 2). During that time, stresses created in the guide plate are uniformly distributed over the entire area of the arch-shaped guide plate 20. Thus, the guide plate 20 does not undergo plastic deformation which may otherwise occur due to stress concentration. By virtue of the arch shape, the guide plate 20 can exhibit a spring action which is effective to absorb shock forces or impacts exerted on the sprocket 40 during meshing engagement between the chain and the sprocket 40. Thus, the arch-shaped guide plate 20 is substantially free from stress concentration and has high durability and also can greatly decrease the meshing sounds of the silent chain.

As described above, the guide plate of the present invention is generally arch-shaped, and an arcuate inner and outer peripheral surfaces of the arch-shaped guide plate extend about the center located at the midpoint of a pitch line segment interconnecting a pair of pin holes of the guide plate. The arcuate inner peripheral surface has a radius of curvature which ranges from 35 to 45% of the chain pitch, and the arcuate outer peripheral surface is blended at opposite ends with the opposite free ends of the arch-shaped guide plate. With the guide plate thus constructed, the occurrence of stress concentration can be avoided, stresses created during the meshing engagement are limited within a range of elastic deformation of the guide plate, and the pin hole surrounding area of the guide plate possesses a sufficient strength. Thus, the silent chain as a whole excels in durability. By virtue of the arch shape, the guide plate can demonstrate an appropriate spring action which is effective to absorb collision force or impacts exerted on the sprocket during meshing engagement between the silent chain and the sprocket. The silent chain is, therefore, prevented from oscillating in the form of a vibrating string or cord, with the result that periodic striking sounds generated upon striking engagement between the vibrating chain and the sprocket can be suppressed. Thus, the meshing noises of the silent chain resulting from the striking sounds can be considerably reduced.

In addition, since the bottom of the arcuate inner peripheral surface of the guide plate is located closer to the sprocket than the top of the arcuate crotch of a mating one of the link plates, a space formed between the link plate teeth and the sprocket teeth during meshing engagement therebetween is kept open at opposite ends facing in widthwise direction of the silent chain. Thus, compressive sounds are no longer emitted upon mutual meshing engagement between the link plate teeth and the sprocket teeth. The meshing noises resulting from the compressive sounds can, therefore, be reduced. Further, an excess lubricating coil trapped in the space between the link plate teeth and the sprocket teeth is permitted to flow smoothly toward opposite ends of the space which open in the widthwise direction of the silent chain. Such lubricating oil flow assists smooth power-transmitting operation of the silent chain.

Obviously, various minor changes and modifications of the present invention are possible in the light of the above teaching. It is therefore to be understood that within the scope of the appended claims, the present invention may be practiced otherwise than as specifically described.

What is claimed is:

1. A guide plate for a silent chain having a chain pitch, said guide plate being substantially arch-shaped and having a pair of pin holes formed therein at a position adjacent to opposite free ends of the arch-shaped guide plate, the arch-shaped guide plate further having an arcuate inner peripheral surface and an arcuate outer peripheral surface both extending arcuately about a center located at the midpoint of a pitch line segment interconnecting said pair of pin holes, said arcuate inner peripheral surface having a radius of curvature which is in the range of 35 to 45% of the chain pitch, and said arcuate outer peripheral surface being blended with said opposite free ends of the arch-shaped guide plate.

2. A silent chain having a chain pitch and comprising:
   a large number of link plates articulately connected together in an interleaved fashion by means of connector pins, each of said link plates having a pair of pin holes through which a pair of connector pins of said connector pins is inserted, respectively, and a pair of link teeth for meshing engagement with a sprocket and connected together by an arcuate crotch; and
   guide plates disposed in pairs on opposite outer sides of the interleaved link plates, said guide plates being substantially arch-shaped bent toward the sprocket and each having a pair of pin holes formed therein at a position adjacent to opposite free ends of the arch-shaped guide plate for fitting engagement with a pair of connector pins of said connector pins, the arch-shaped guide plate further having an arcuate inner peripheral surface and an arcuate outer peripheral surface both extending arcuately about a center located at the midpoint of a pitch line segment interconnecting said pair of pin holes, said arcuate inner peripheral surface having a radius of curvature which is in the range of 35 to 45% of the chain pitch, and said arcuate outer peripheral surface being blended with said opposite free ends of the arch-shaped guide plate.

3. A silent chain according to claim 2, wherein said arcuate inner peripheral surface of each said guide plate has a bottom located closer to the sprocket than the top of said arcuate crotch of a mating one of the link plates, there being defined between said arcuate inner peripheral surface and said arcuate crotch a substantially almond-shaped space which opens at opposite ends in the widthwise direction of the silent chain.

* * * * *